US009102392B2

(12) United States Patent
Gray et al.

(10) Patent No.: US 9,102,392 B2
(45) Date of Patent: Aug. 11, 2015

(54) METHOD AND APPARATUS FOR AIR FLOW CONTROL IN AN AIRCRAFT SIDEWALL VOLUME

(75) Inventors: John C. Gray, Shoreline, WA (US); Leigh M. Sedgwick, Mercer Island, WA (US); Scott M. Satterfield, Seattle, WA (US); John D. Blake, Seattle, WA (US); Charles E Kusuda, Mukiltco, WA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 12/968,835

(22) Filed: Dec. 15, 2010

(65) Prior Publication Data
US 2012/0156979 A1    Jun. 21, 2012

(51) Int. Cl.
 *B60H 1/00*   (2006.01)
 *B61D 27/00*  (2006.01)
 *B63J 2/00*   (2006.01)
 *B64D 13/00*  (2006.01)
 *B64C 1/06*   (2006.01)

(52) U.S. Cl.
 CPC . *B64C 1/067* (2013.01); *Y02T 50/46* (2013.01)

(58) Field of Classification Search
 CPC ................................ B64C 1/067; Y02T 50/46
 USPC ....................... 454/76; 244/118.5, 119, 129.1
 See application file for complete search history.

(56) References Cited

U.S. PATENT DOCUMENTS

| 1,918,568 | A | * | 7/1933 | Schirmer | 454/69 |
|---|---|---|---|---|---|
| 2,160,066 | A | * | 5/1939 | Frische | 52/407.1 |
| 2,263,919 | A | * | 11/1941 | Darragh, Jr. | 52/246 |
| 2,427,698 | A | * | 9/1947 | Arnhym | 454/185 |
| 2,516,805 | A | * | 7/1950 | Rother et al. | 454/76 |
| 2,694,537 | A | * | 11/1954 | Reichert | 244/118.5 |
| 2,912,724 | A | * | 11/1959 | Wilkes | 52/302.3 |
| 3,623,453 | A | * | 11/1971 | Seimiya et al. | 118/309 |
| 3,740,905 | A | * | 6/1973 | Adams | 52/404.3 |
| 3,867,244 | A | * | 2/1975 | Adams | 428/182 |
| 4,178,840 | A | * | 12/1979 | Caknis | 454/267 |
| 4,646,993 | A | * | 3/1987 | Baetke | 244/117 R |
| 5,238,220 | A | * | 8/1993 | Shell et al. | 251/67 |
| 5,386,952 | A | * | 2/1995 | Nordstrom et al. | 244/118.1 |
| 5,779,193 | A | * | 7/1998 | Sloan | 244/117 R |
| 5,788,184 | A | * | 8/1998 | Eddy | 244/121 |
| 5,897,079 | A | * | 4/1999 | Specht et al. | 244/118.5 |

(Continued)

FOREIGN PATENT DOCUMENTS

CN          101636314 A     1/2010
WO     WO 2008101986 A1 *  8/2008

OTHER PUBLICATIONS

Office Action for Chinese Application No. 201110343319.0 dated Mar. 20, 2015.

*Primary Examiner* — Steven B McAllister
*Assistant Examiner* — Jonathan Cotov
(74) *Attorney, Agent, or Firm* — Alston & Bird LLP

(57) ABSTRACT

An aircraft fuselage sidewall may include an aircraft sidewall volume and a flow controller. The aircraft sidewall volume may be delineated by an aircraft skin forming an outboard boundary of the aircraft sidewall volume, a passenger cabin sidewall forming an inboard boundary of the aircraft sidewall volume and fuselage frame structures forming axial boundaries of the aircraft sidewall volume. The flow controller may be positioned at a portion of the aircraft sidewall volume to selectably control air flow through the aircraft sidewall volume.

10 Claims, 6 Drawing Sheets

(56) References Cited

U.S. PATENT DOCUMENTS

| | | | | |
|---|---|---|---|---|
| 6,139,423 | A * | 10/2000 | Wadey | 454/142 |
| 6,491,254 | B1 * | 12/2002 | Walkinshaw et al. | 244/118.5 |
| 6,634,597 | B2 * | 10/2003 | Johnson et al. | 244/118.5 |
| 7,040,575 | B2 * | 5/2006 | Struve et al. | 244/118.5 |
| 7,325,569 | B2 * | 2/2008 | Denike et al. | 137/899.2 |
| 7,766,276 | B2 * | 8/2010 | Buchholz et al. | 244/119 |
| 8,079,443 | B2 * | 12/2011 | Keller | 181/292 |
| 8,157,209 | B2 * | 4/2012 | Dittmar et al. | 244/117 R |
| 8,245,974 | B2 * | 8/2012 | Paul | 244/129.1 |
| 8,328,607 | B2 * | 12/2012 | Reisbach | 454/76 |
| 8,336,822 | B2 * | 12/2012 | MacGregor et al. | 244/119 |
| 8,393,577 | B2 * | 3/2013 | Roth et al. | 244/129.5 |
| 8,876,048 | B2 * | 11/2014 | Herrmann et al. | 244/119 |
| 2003/0087049 | A1 * | 5/2003 | Hachenberg et al. | 428/34.1 |
| 2005/0044712 | A1 * | 3/2005 | Gideon et al. | 29/897.32 |
| 2008/0302910 | A1 * | 12/2008 | Calamvokis | 244/118.5 |
| 2009/0189018 | A1 | 7/2009 | Dittmar et al. | |
| 2009/0308975 | A1 | 12/2009 | MacGregor et al. | |
| 2011/0009042 | A1 * | 1/2011 | Joern | 454/71 |
| 2012/0068012 | A1 * | 3/2012 | Dolzinski et al. | 244/1 N |
| 2012/0214393 | A1 * | 8/2012 | Vogt et al. | 454/76 |

* cited by examiner

METHOD AND APPARATUS FOR AIR FLOW CONTROL IN AN AIRCRAFT SIDEWALL VOLUME

TECHNOLOGICAL FIELD

Embodiments of the present disclosure relate generally to aircraft design and, more particularly, to an aircraft configuration with air flow control in an aircraft sidewall volume.

BACKGROUND

Modern fixed wing commercial transport aircraft share features in common with their predecessors, including wings, a fuselage, control surfaces and engines. Continuous advancement in aerodynamics, materials, engine power and efficiency, and component design contribute to faster, safer air travel. The arrangement of the common aircraft features, however remains unchanged and the cylindrical fuselage has remained a recognizable and consistent feature of commercial aircraft.

Particularly for commercial transport aircraft, the fuselage is typically divided into separate volumes. In many instances, passengers sit in a volume referred to as the passenger cabin. The passenger cabin is often separated from volumes below in which cargo is carried, in which airplane mechanical and electrical systems are located, and through which air flows. The cargo volumes may be separated axially by the wing box and main landing gear bay into the forward and aft cargo compartments. The combination of the passenger cabin and crown volumes may be referred to collectively as the upper lobe and the combination of the cargo compartments, bilge, left and right cheeks, and floor beam volumes may be referred to collectively as the lower lobe. In many situations, an uncontrolled air flow exists between the upper and lower lobes.

Conditioned air is provided to the passenger volume to pressurize the airplane fuselage, control temperature, contaminants and odors. This air must flow from the upper lobe to the lower lobe of the fuselage where it can either be recirculated back to the passenger cabin or be released to the ambient atmosphere from which it was originally drawn. Control of air flow from the upper to lower lobes is intended to occur through return air grilles located near the interface of the floor and passenger cabin sidewalls. However, a significant portion of the air flow supplied to the passenger cabin returns to the lower lobe through a path between the airplane skin and passenger cabin sidewall, through gaps in sidewall insulation blankets and fire stops, i.e. the air flow is uncontrolled. This sidewall air flow is contained in a channel that is bounded outboard by the airplane fuselage skin, inboard by the passenger cabin sidewall panel, and axially by the fuselage frame channels. This region may be referred to as the aircraft sidewall volume. In many situations, heat is transferred between the air and the bounding surfaces by convection, and from the bounding surfaces to adjacent structure by conduction as the air moves through the sidewall volume from upper lobe to lower lobe.

BRIEF SUMMARY

Some embodiments of the present disclosure relate to the provision of an aircraft configuration that improves air flow control in the aircraft sidewall volume. By controlling air flow in the aircraft sidewall volume, some of the heat transfer modes that might occur in an uncontrolled air flow condition may be manipulated so that certain effects may be either prevented or allowed to occur in a manner that enhances aircraft energy efficiency. Thus, for example, certain air flows that enhance heat rejection may be allowed when that heat rejection would reduce the fuselage air conditioning load (e.g., in flight at altitude) and other flows that enhance insulation from the ambient environment may be facilitated when it would reduce the fuselage air conditioning load (e.g., on the ground during a hot day).

In one example embodiment, an aircraft fuselage sidewall is provided. The aircraft fuselage sidewall may include an aircraft sidewall volume and a flow controller. The aircraft sidewall volume may be delineated by an aircraft skin forming an outboard boundary of the aircraft sidewall volume, a passenger cabin sidewall forming an inboard boundary of the aircraft sidewall volume and fuselage frame structures forming axial boundaries of the aircraft sidewall volume. The flow controller may be located at a position in the aircraft sidewall volume to selectably control air flow through the aircraft sidewall volume.

In another example embodiment, an aircraft is provided. The aircraft may include a fuselage with an upper lobe comprised of a passenger cabin and crown volume, and a lower lobe comprised of cargo compartments, left and right cheeks, bilge and floor beam volumes. The fuselage may include an aircraft skin defining an outer shell of the aircraft. The passenger cabin may be bounded by passenger cabin sidewalls on each side and may be positioned within a portion of the fuselage below a crown of the aircraft. The lower lobe may be disposed below the passenger cabin for storing aircraft cargo. In some cases, the aircraft sidewall volume may be bounded by the aircraft skin and each respective one of the passenger cabin sidewalls. The aircraft skin may form an outboard boundary of the aircraft sidewall volume, a passenger cabin sidewall may form an inboard boundary of the aircraft sidewall volume and fuselage frame structures may form axial boundaries of the aircraft sidewall volume. The aircraft sidewall volume may include a flow controller configured to selectably control air flow through the aircraft sidewall volume from the crown to the lower lobe.

In another example embodiment, a method of controlling air flow in an aircraft is provided. The method may include providing an aircraft sidewall volume bounded by an aircraft skin forming an outboard boundary of the aircraft sidewall volume, a passenger cabin sidewall forming an inboard boundary of the aircraft sidewall volume and fuselage frame structures forming axial boundaries of the aircraft sidewall volume. The method may further include selectably controlling air flow through the aircraft sidewall volume based on operating conditions of the aircraft.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 3:
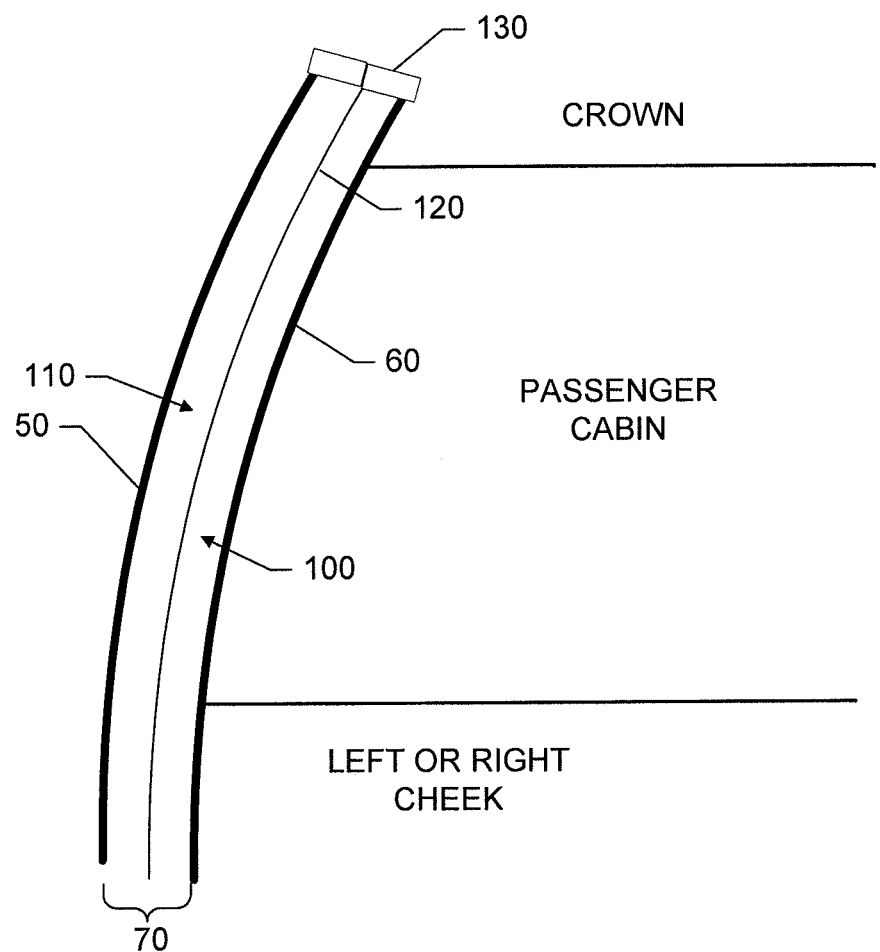
Figure 4:
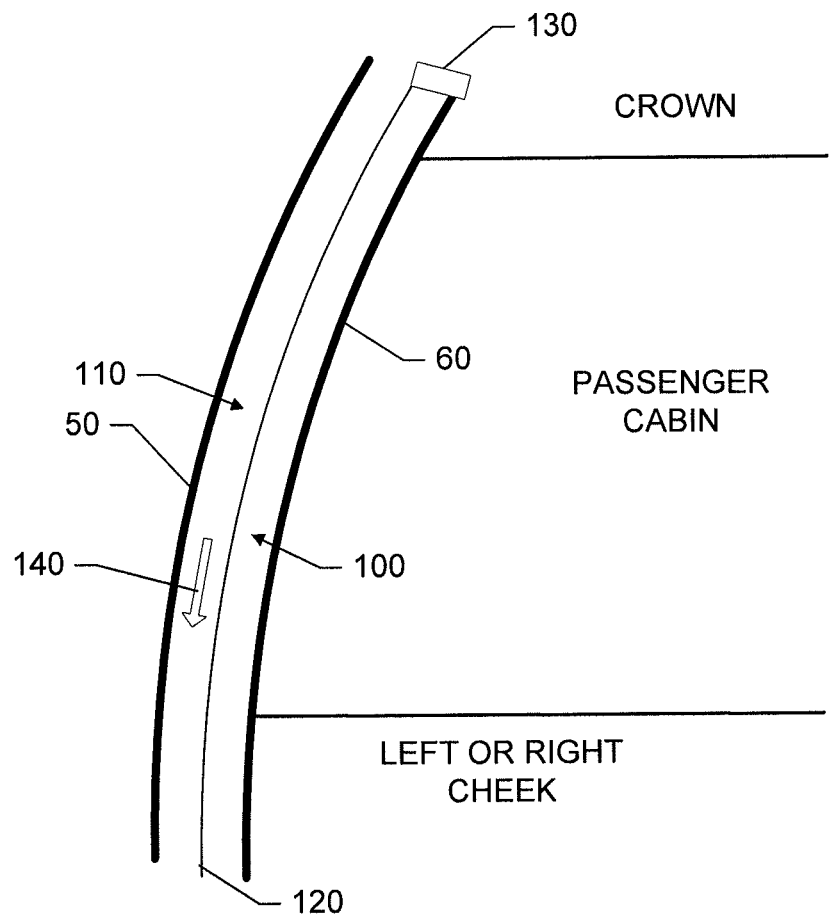
Figure 5:
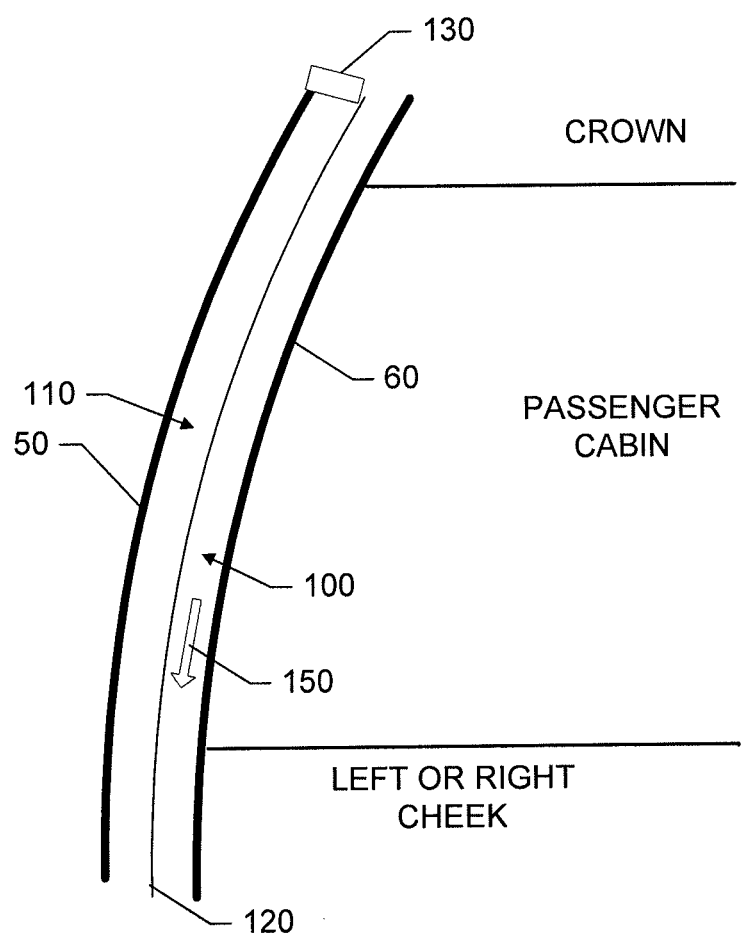
Figure 6:
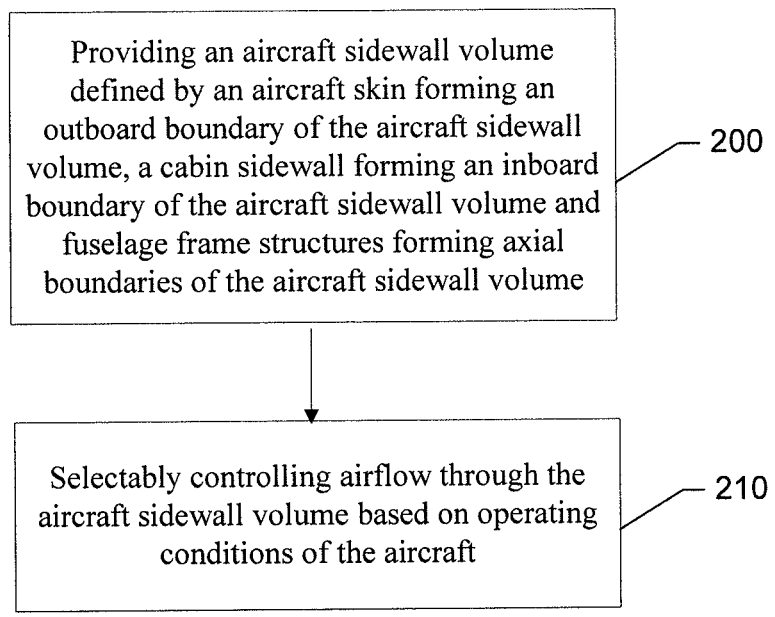

FIG. 3 provides a cross-section view of a portion of an aircraft sidewall volume employing controllable air flow in one of at least two distinct selectable air flow volumes provided according to an example embodiment;

FIG. 4 provides a view of one configuration of the controllable air flow structure shown in FIG. 3 that provides improved insulation properties according to an example embodiment;

FIG. 5 provides a view of one configuration of the controllable air flow structure shown in FIG. 3 that provides improved heat rejection properties according to an example embodiment; and FIG. 6 is a block diagram of a method of controlling air flow in an aircraft according to an example embodiment.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

As discussed above, commercial aircraft that have upper and lower lobes may experience air flow in the aircraft sidewall volume. The air flow, which is often a low volumetric flow is driven by relatively low differential pressures, and typically flows downward in the space between the aircraft skin and the passenger cabin sidewall panel. By controlling this air flow in the aircraft sidewall volume, variable heat transfer rates become selectable. Thus, air flow conditions in the aircraft sidewall volume may be controlled or manipulated so that certain heat transfer mechanisms may be either prevented or promoted.

Figure 1:
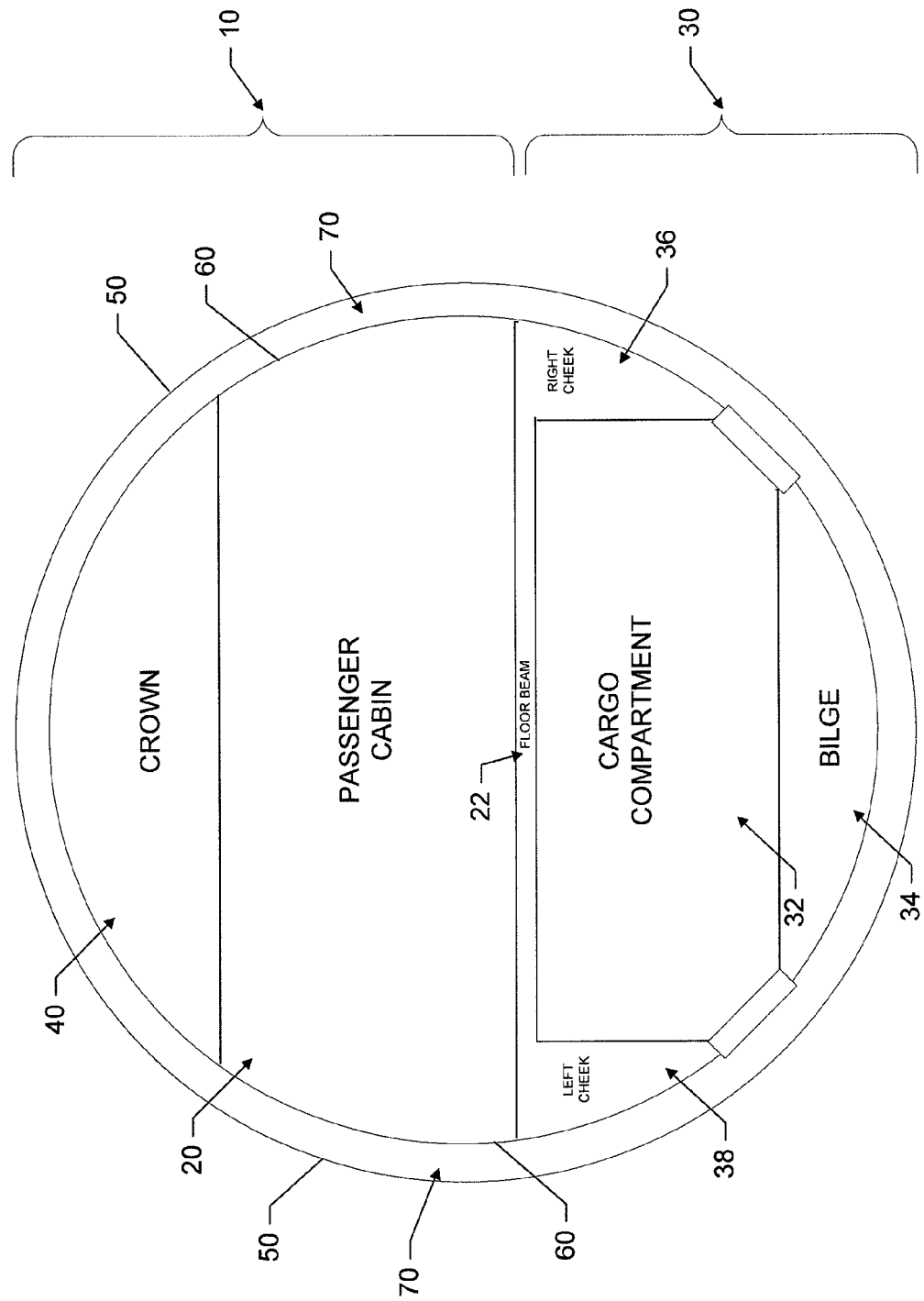
FIG. 1 illustrates a cross-section view of an aircraft fuselage according to an example embodiment.

FIG. 1 illustrates a cross-section view of an aircraft fuselage according to an example embodiment. The view of FIG. 1 illustrates an upper lobe 10 corresponding to a passenger cabin 20 and crown 40, and a lower lobe 30 corresponding to an area typically used to store cargo and/or passenger baggage. In some cases, the crown 40 may be defined above the passenger cabin 20. The cargo or baggage stored in the lower lobe 30 may be positioned below a floor beam 22 of the passenger cabin 20 and may be stored in a cargo compartment 32. The cargo compartment may be disposed above a bilge 34 and between a right cheek 36 and a left cheek 38 of the lower lobe 30. As shown in FIG. 1, aircraft skin 50 may define an external boundary of the aircraft fuselage. A passenger cabin sidewall 60 may define a portion of an external boundary of the passenger cabin 20. The passenger cabin sidewall 60 may be spaced apart from the aircraft skin 50 to define an aircraft sidewall volume 70. In some cases, structural frame members that form the fuselage, and also form the structure to which the aircraft skin 50 is bonded, may extend concentrically within the aircraft skin 50 and between the aircraft skin 50 and the passenger cabin sidewall 60 to form channels through which air may flow within the aircraft sidewall volume 70.

The passenger cabin 20 is typically an air conditioned space, in order to provide passenger comfort. In fact, the environment of the passenger cabin 20 is typically closely controlled to enable passengers to travel in a relatively comfortable environment. Many aircraft employ air conditioning (AC) packs to assist in controlling the environment of the passenger cabin 20 for passenger comfort and an electric equipment cooling system (EECS) for controlling component temperatures. The movement of air among the various volumes by means of mechanical equipment may create differential pressures between various volumes in the upper and lower lobes, specifically between the crown and the left and right cheeks. In some cases, the differential pressures may cause air to flow within the aircraft sidewall volume 70. More specifically, in some cases, the air may flow within the channels bounded by structural frame members within the aircraft sidewall volume 70. The air flow typically moves from an upper region of the aircraft to lower regions of the aircraft. Thus, for example, air flow may proceed in the aircraft sidewall volume 70 in a direction from the crown 40 downward between the aircraft skin 50 and the passenger cabin sidewall 60 toward the lower lobe 30.

Figure 2:
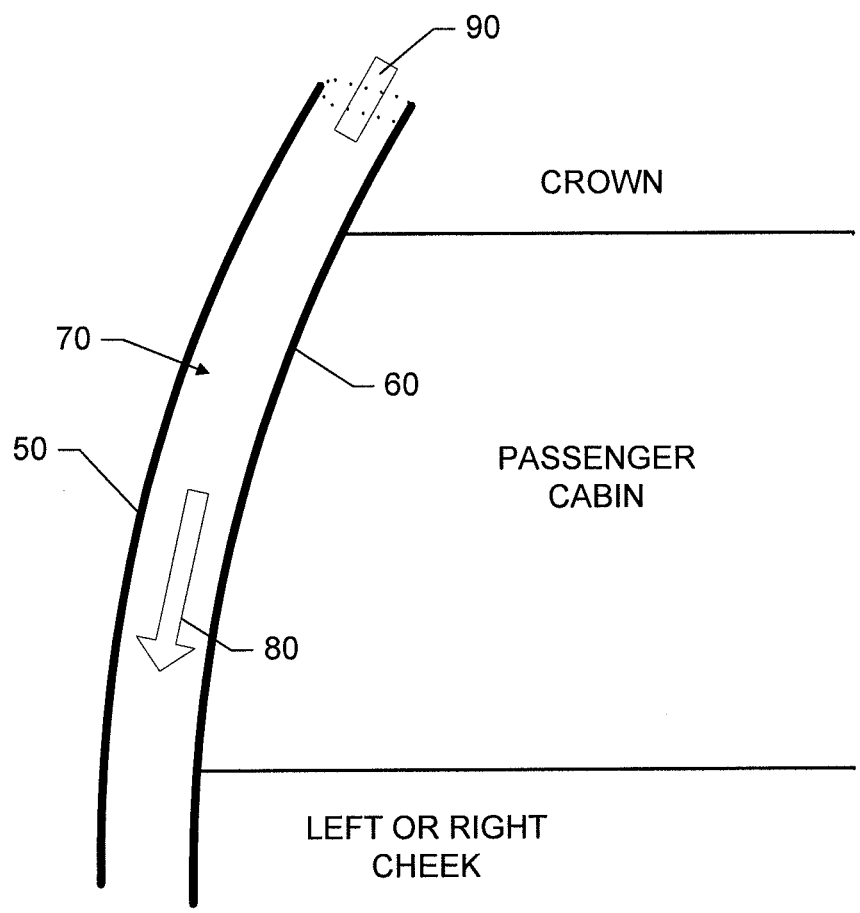
FIG. 2 illustrates a cross-section view of a portion of an aircraft sidewall volume permitting air flow according to an example embodiment.

FIG. 2 illustrates a cross-section view of a portion of an aircraft sidewall volume permitting air flow according to an example embodiment. In particular, FIG. 2 illustrates a portion of the aircraft sidewall volume 70 that is bounded by the aircraft skin 50 and the passenger cabin sidewall 60. FIG. 2 also illustrates the portion of the aircraft sidewall relative to the crown 40, passenger cabin 20 and right cheek 36 or left cheek 38 according to an example embodiment. As shown in FIG. 2, the direction of air flow is generally downward as indicated by arrow 80. Of note, the aircraft sidewall volume 70 may include insulation blankets, fire stops and other potential obstructions to air flow. However, the flow of air indicated by arrow 80 generally proceeds through the aircraft sidewall volume 70 via gaps and/or other flow paths through and around any obstructions within the aircraft sidewall volume 70.

Generally speaking, when air flow in the aircraft sidewall volume 70 is uncontrolled certain heat transfer processes will naturally occur. For example, when the aircraft skin 50 is relatively hot (e.g., when the aircraft is on the ground and absorbing heat from the sun), the air flow in the aircraft sidewall volume 70 may remove heat from the aircraft skin 50 and heat the air in the aircraft sidewall volume. Meanwhile, when the aircraft skin 50 is relatively cold (e.g., when the aircraft is at altitude), the air flow in the aircraft sidewall volume 70 may pass heat out of the air in the aircraft sidewall volume 70 and to the aircraft skin 50, thereby cooling the air in the aircraft sidewall volume 70. Thus, the aircraft skin 50 may form a heat source in some cases and a heat sink in others.

As indicated above, some example embodiments of the present invention may enable controlling and utilization of the air flows that may occur in the aircraft sidewall volume 70. In this regard, some example embodiments may provide for dividing the aircraft sidewall volume into at least two separate volumes that can be controlled for selectively allowing or preventing air flow. The selective control of the air flows may enable advantageous use of air flows in the aircraft sidewall volume 70 to reduce the heat load on aircraft AC packs and the EECS in certain situations. For example, sidewall airflow may be blocked (e.g., shut off at will) in order to increase airflow velocity through the passenger cabin (e.g., through return air grilles into the passenger cabin). This type of airflow control may be useful, for example, in the event of a lower lobe fire. In some cases, the air flow through the aircraft sidewall volume 70 may be used to form part of the air that circulates in the air conditioning system of the aircraft. Thus, in some embodiments, a fan or other air circulation mechanism may be employed to at least partially drive flow through the aircraft sidewall volume 70. However, no forced flow is typically necessary and some example embodiments may operate without anything other than existing differential pressures driving flow through the aircraft sidewall volume 70. As such, example embodiments may increase the thermal efficiency of aircraft. Moreover, the weight of the EECS hardware may be reduced due to the increased thermal efficiency and thus the reduced weight of the aircraft may also lead to improved aircraft fuel efficiency.

In an example embodiment, a flow controller 90 may be placed in the aircraft sidewall volume 70 to selectively permit or restrict flow through the aircraft sidewall volume 70. The flow controller 90 may take the form of moveable louvers or flapper valves that may be disposed in some or all of the channels formed in the aircraft sidewall volume 70. However, in other cases, the flow controller 90 may take the form of a bladder that may be filled with air or some other fluid to restrict flow through the aircraft sidewall volume 70 or may be enabled to be emptied of air or another fluid to permit flow through the aircraft sidewall volume 70. In FIG. 2, the flow controller 90 is shown as a rotatable member that may rotate to an open position (shown in solid lines) and a closed position (shown in dotted lines), but any suitable mechanism may be employed.

The flow controller 90 may typically be placed at a relatively high portion of the aircraft sidewall volume 70 (e.g., at or near an intersection between the crown 40 and the passenger cabin 20. However, the flow controller 90 could be placed at any location within the aircraft sidewall volume 70. Air flow through the aircraft sidewall volume 70 may be allowed (by opening the flow controller 90) when heat transfer that would occur via the aircraft sidewall volume would be advantageous (e.g., to reduce the burden on environmental control equipment), or may be restricted (by closing the flow controller 90) when heat transfer would not be advantageous (e.g., to provide insulation via formation of an adiabatic space in the aircraft sidewall volume 70.

In some embodiments, rather than simply controlling air flow through the aircraft sidewall volume 70 in aggregate, the aircraft sidewall volume 70 may be split into two separate volumes that may each be selectively controlled as desired. FIG. 3 provides a cross-section view of a portion of an aircraft sidewall volume employing controllable air flow in one of at least two distinct selectable air flow volumes provided according to an example embodiment. As shown in FIG. 3, the aircraft sidewall volume 70 may be split into an inboard volume 100 and an outboard volume 110 by a dividing member 120. The dividing member 120 may extend through the aircraft sidewall volume 70 between the aircraft skin 50 and the passenger cabin sidewall 60. In some cases, the dividing member 120 may maintain a substantially constant distance (though not necessarily equidistant) from aircraft skin 50 and/or from the passenger cabin sidewall 60. Moreover, in some embodiments, the dividing member 120 may be substantially equidistant from both the aircraft skin 50 and the passenger cabin sidewall 60. The inboard volume 100 may be defined as the space bounded by the passenger cabin sidewall 60 and the dividing member 120. The outboard volume 110 may be defined as the space bounded by the aircraft skin 50 and the dividing member 120. In an example embodiment, the dividing member 120 may be a vapor barrier. The vapor barrier may be formed of a thin plastic or other relatively light material. In some cases, the vapor barrier may form an insulated flow channel divider to create two separate and controllable air flow channels. The vapor barrier may also be used to ensure no smoke generated during a lower lobe fire can penetrate back into the passenger cabin.

In an example embodiment, a flow controller 130 may be provided to allow or restrict flow in the inboard volume 100 and/or the outboard volume 110. In some cases, the flow controller 130 may include a single valve that can control flow in either the inboard volume 100 or the outboard volume 110. For example, the flow controller 130 may be a flapper valve that may swing in one direction to restrict flow in the inboard volume 100 and swing in another direction to restrict flow in the outboard volume 110. However, in some cases, it may be further desirable for the flow controller 130 to be able to enable flow or restrict flow to both the inboard volume 100 and the outboard volume 110 at the same time. Accordingly, in some cases, the flow controller 130 may include flow control valves in each of the inboard volume 100 and the outboard volume 110. As an example, the flow controller 130 may be embodied as a bladder valve that may be positioned in one or more of the channels of the inboard volume 100 and the outboard volume 110 to enable selective restriction of either, both or none of the inboard volume 100 and the outboard volume 110.

FIG. 4 provides a view of one configuration of the controllable air flow structure shown in FIG. 3 that provides improved insulation properties according to an example embodiment and FIG. 5 provides a view of one configuration of the controllable air flow structure shown in FIG. 3 that provides improved heat rejection properties according to an example embodiment. In this regard, FIG. 4 shows a situation in which the flow of air in the inboard volume 100 is restricted, but the flow of air in the outboard volume 110 is not restricted as indicated by arrow 140. The flow control condition shown in FIG. 4 may be useful for in-flight situations when the aircraft skin 50 is cold. The restriction of air flow in the inboard volume 100 may provide for the inboard volume 100 to generate insulating properties. Meanwhile, the enablement of flow through the outboard volume 110 may enable heat transfer to occur to cool the air in the outboard volume 110 to reduce the cooling load for the AC packs and provide a reduced operating temperature for the EECS.

FIG. 5 shows a situation in which the flow of air in the inboard volume 100 is not restricted as indicated by arrow 150, but the flow of air in the outboard volume 110 is restricted. The flow control condition shown in FIG. 5 may be useful for ground operation when the aircraft skin 50 is hot due to thermal energy provided by the sun. The restriction of the outboard volume 110 may provide for the outboard volume 110 to generate insulating properties. Meanwhile, the enablement of flow through the inboard volume 100 may enable heat transfer to occur to remove heat from the passenger cabin 20 to reduce the cooling load for the AC packs and provide a reduced operating temperature for the EECS. As indicated above, this may improve thermal efficiency of the aircraft and also enable fuel efficiency to be improved due to corresponding weight reductions since less hardware may be required to offset thermal loads.

Accordingly, the different flow control conditions shown in FIGS. 4 and 5 illustrate the selectable restriction and/or enablement of flow in each of the two flow channels created (the inboard volume 100 and the outboard volume 110). Thus, example embodiments may provide for alternately using one of the channels for insulation and using the other channel simultaneously for heat transfer, with the channel that is used for insulation and the channel used for heat transfer being selected based on the operating mode of the aircraft (e.g., in flight or ground operations).

In some embodiments, the general flow of passenger cabin air distribution may be provided by supplying passenger cabin air from below the floor and into the passenger cabin 20. Extraction of passenger cabin air may then be conducted from the crown 40. The weight and recirculation fan power of the air distribution system may therefore be reduced since the flow of air in the aircraft sidewall volume 70 may supplement the air distribution system. In some cases, reductions in air distribution system noise levels transmitted and radiated may also be experienced.

FIG. 6 is a block diagram of a method of controlling air flow in an aircraft according to an example embodiment. As shown in FIG. 6, the method may include providing an aircraft sidewall volume delineated by an aircraft skin forming an outboard boundary of the aircraft sidewall volume, a passenger cabin sidewall forming an inboard boundary of the aircraft sidewall volume and fuselage frame structures forming axial boundaries of the aircraft sidewall volume at operation 200. The method may further include selectably controlling air flow through the aircraft sidewall volume based on operating conditions of the aircraft at operation 210.

In some cases, selectably controlling air flow through the aircraft sidewall volume may include providing flow restriction through the aircraft sidewall volume to provide insulation and enabling flow through the aircraft sidewall volume to provide heat transfer between air flowing through the aircraft sidewall volume and one or more surfaces defining the aircraft sidewall volume. In some embodiments, the aircraft sidewall volume may include a dividing member disposed in the aircraft sidewall volume to divide the aircraft sidewall volume into an inboard volume between the dividing member and the passenger cabin sidewall and an outboard volume between the dividing member and the aircraft skin. In such example embodiments, selectably controlling air flow through the aircraft sidewall volume may include restricting flow through one of the inboard volume or the outboard volume to providing insulating properties and simultaneously enabling flow through the other one of the inboard volume or the outboard volume to enable heat transfer between air in the other one of the inboard volume or the outboard volume and a surface defining the corresponding other one of the inboard volume or the outboard volume. In an example embodiment, air flow is restricted in the inboard volume during in-flight operation and air flow is restricted in the outboard volume during ground operation.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An aircraft fuselage sidewall comprising:
    an aircraft sidewall volume delineated by an aircraft skin forming an outboard boundary of the aircraft sidewall volume, a passenger cabin sidewall forming an inboard boundary of the aircraft sidewall volume and fuselage frame structures forming axial boundaries of the aircraft sidewall volume;
    a flow controller positioned at a portion of the aircraft sidewall volume to selectably control air flow through the aircraft sidewall volume, wherein the flow controller is positioned at an intersection between a crown and the passenger cabin so as to permit passenger cabin air to be extracted from the crown; and
    a dividing member disposed in the aircraft sidewall volume to divide the aircraft sidewall volume into an inboard volume between the dividing member and the passenger cabin sidewall and an outboard volume between the dividing member and the aircraft skin,
    wherein the flow controller is configured, based on an operating mode of the aircraft being an in-flight operation, to restrict flow through the inboard volume to provide insulating properties and simultaneously enable flow through the outboard volume to enable heat transfer between air in the outboard volume and a surface defining the outboard volume, and
    wherein the flow controller is configured, based on an operating mode of the aircraft being a ground operation, to restrict flow through the outboard volume to provide insulating properties and simultaneously enable flow through the inboard volume to enable heat transfer between air in the inboard volume and a surface defining the inboard volume.

2. The aircraft fuselage sidewall of claim 1, wherein the flow controller is configured to provide flow restriction through the aircraft sidewall volume to provide insulation and to enable flow through the aircraft sidewall volume to provide heat transfer between air flowing through the aircraft sidewall volume and one or more surfaces defining the aircraft sidewall volume.

3. The aircraft fuselage sidewall of claim 1, wherein the dividing member is a vapor barrier.

4. The aircraft fuselage sidewall of claim 3, wherein the vapor barrier is formed of a plastic material.

5. The aircraft fuselage sidewall of claim 3, wherein the vapor barrier is equidistant from the aircraft skin and the passenger cabin sidewall.

6. The aircraft fuselage sidewall of claim 1, wherein the flow controller is configured to selectably control air flow through the inboard volume and the outboard volume.

7. The aircraft fuselage sidewall of claim 1, wherein the flow controller is a flapper valve.

8. The aircraft fuselage sidewall of claim 1, wherein the flow controller is configured to alternately block flow through the inboard volume and the outboard volume while alternately allowing flow through the outboard volume and the inboard volume, respectively.

9. The aircraft fuselage sidewall of claim 1, wherein the aircraft sidewall volume is configured such that air is received into the aircraft sidewall volume from a crown of the aircraft.

10. The aircraft fuselage sidewall of claim 1, wherein the flow controller comprises a bladder valve.

* * * * *